(12) United States Patent
Drogo (10) Patent No.: US 10,440,230 B2
(45) Date of Patent: Oct. 8, 2019

(54) MULTI-COLOR PRINTING WITH PRINT DATA GENERATED BASED ON HALFTONE PLANES AND COMBINED FIXER PLANE

(71) Applicant: Hewlett-Packard Development Company, L.P., Houston, TX (US)

(72) Inventor: Leslie Drogo, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/096,782

(22) PCT Filed: Jul. 15, 2016

(86) PCT No.: PCT/US2016/042675
§ 371 (c)(1),
(2) Date: Oct. 26, 2018

(87) PCT Pub. No.: WO2018/013146
PCT Pub. Date: Jan. 18, 2018

(65) Prior Publication Data
US 2019/0132483 A1 May 2, 2019

(51) Int. Cl.
*H04N 1/52* (2006.01)
*H04N 1/54* (2006.01)
*G06K 15/02* (2006.01)
*H04N 1/405* (2006.01)
*B41J 11/00* (2006.01)
(Continued)

(52) U.S. Cl.
CPC ........... *H04N 1/52* (2013.01); *G06K 15/1878* (2013.01); *G06K 15/1881* (2013.01); *H04N 1/405* (2013.01); *H04N 1/54* (2013.01); *B41J 11/0015* (2013.01); *G03G 15/6585* (2013.01); *H04N 1/034* (2013.01)

(58) Field of Classification Search
None
See application file for complete search history.

(56) References Cited

U.S. PATENT DOCUMENTS

| | | |
|---|---|---|
| 6,965,453 B1 | 11/2005 | Mori |
| 7,164,498 B2 | 1/2007 | Van Bael |
| 7,463,385 B2 | 12/2008 | Gondak et al. |

(Continued)

OTHER PUBLICATIONS

Color Gamut, Jul. 1993, < http://www.greenharbor.com/LHTIfolder/lhti9304.pdf >.

(Continued)

*Primary Examiner* — Scott A Rogers
(74) *Attorney, Agent, or Firm* — Mannava & Kang (57) ABSTRACT

According to examples, multi-color printing may include generating, based on an analysis of a print job image, a plurality of contone planes that represent the print job image. Multi-color printing may further include generating, based on an analysis of two or more sets of the contone planes determined from the plurality of contone planes, two or more corresponding sets of halftone planes and a fixer plane for each set of the halftone planes. Multi-color printing may further include generating, based on an analysis of the fixer plane for each set of the halftone planes, a combined fixer plane, and generating, based on an analysis of the two or more corresponding sets of halftone planes and the combined fixer plane, print data to print the print job image.

15 Claims, 7 Drawing Sheets

(51) Int. Cl.
*H04N 1/034* (2006.01)
*G03G 15/00* (2006.01)

(56) References Cited

U.S. PATENT DOCUMENTS

| | | | |
|---|---|---|---|
| 7,506,584 B2 | 3/2009 | Bestmann | |
| 8,088,207 B2 | 1/2012 | Bastidas et al. | |
| 8,520,261 B2 * | 8/2013 | Kobayashi | H04N 1/52 |
| | | | 358/3.03 |
| 8,711,427 B2 * | 4/2014 | Tokushima | H04N 1/54 |
| | | | 358/1.2 |
| 8,913,295 B2 * | 12/2014 | Yoshida | G06K 15/1878 |
| | | | 358/1.15 |
| 9,077,939 B1 | 7/2015 | Ayash et al. | |
| 9,083,920 B2 * | 7/2015 | Awamura | H04N 1/54 |
| 9,195,200 B2 * | 11/2015 | Kogusuri | G03G 15/6585 |
| 9,223,281 B2 * | 12/2015 | Yoshida | G03G 15/6585 |
| 9,275,312 B2 * | 3/2016 | Yukie | G06K 15/02 |
| 9,286,554 B1 | 3/2016 | Maltz | |
| 9,348,294 B2 * | 5/2016 | Awamura | G03G 15/6585 |
| 9,508,030 B2 * | 11/2016 | Habu | G06K 15/02 |
| 9,606,494 B2 * | 3/2017 | Kogusuri | G03G 15/6585 |
| 2005/0083541 A1 | 4/2005 | Clark et al. | |
| 2012/0237244 A1 * | 9/2012 | Yoshikawa | G03G 15/6585 |
| | | | 399/67 |
| 2012/0293815 A1 | 11/2012 | Wen | |
| 2013/0271791 A1 * | 10/2013 | Miyazaki | H04N 1/54 |
| | | | 358/2.1 |
| 2013/0279958 A1 * | 10/2013 | Yukie | G03G 15/6585 |
| | | | 399/341 |
| 2014/0232783 A1 * | 8/2014 | del Rio | B41J 2/2114 |
| | | | 347/21 |
| 2014/0253975 A1 | 9/2014 | Robinson | |

OTHER PUBLICATIONS

Extended Gamut Coated Guide, 2015, < http://www.pantone.com/what-is-extended-gamut >.

* cited by examiner

ACCESS A PLURALITY OF CONTONE PLANES THAT
REPRESENT A PRINT JOB IMAGE
602

GENERATE, BASED ON AN ANALYSIS OF A PLURALITY OF SETS OF THE
CONTONE PLANES DETERMINED FROM THE PLURALITY OF CONTONE
PLANES, A PLURALITY OF CORRESPONDING SETS OF HALFTONE
PLANES AND A FIXER PLANE FOR EACH SET OF THE HALFTONE PLANES
604

GENERATE, BASED ON AN ANALYSIS OF THE FIXER PLANE FOR EACH
SET OF THE HALFTONE PLANES, A COMBINED FIXER PLANE
606

GENERATE, BASED ON AN ANALYSIS OF THE PLURALITY OF
CORRESPONDING SETS OF HALFTONE PLANES AND THE COMBINED
FIXER PLANE, PRINT DATA TO PRINT THE PRINT JOB IMAGE
608

MULTI-COLOR PRINTING WITH PRINT DATA GENERATED BASED ON HALFTONE PLANES AND COMBINED FIXER PLANE

BACKGROUND INFORMATION

In some printing systems, printing materials of different colors may be ejected and/or deposited onto a substrate or media during printing. An example of a substrate includes paper. The printing material may be ejected onto the substrate in the form of drops to generate a printed substrate.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, methods and structures apparent to one of ordinary skill in the art have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, a multi-color printing apparatus and a method for multi-color printing are disclosed herein. In some examples, the printing apparatus may include a printhead. In some examples, the printing apparatus may correspond to a component of a printing system. In some examples, the printing apparatus may include a fluid ejection device that is coupled to a fluid container such that the fluid ejection device and fluid container may be an integrated device, such as a printer cartridge. Some examples of the printing apparatus may comprise a plurality of fluid ejection devices, where such plurality may be arranged in an array, such as a page-wide array.

The printing apparatus may include fixed and/or movable printer cartridges. Examples of printing systems that include fixed printer cartridges include fixed array printing systems, and other such printing systems. Such fixed array printing systems may include one or several fluid ejection devices that are disposed in a fixed arrangement relative to a movable substrate. Examples of printing systems that include movable fluid ejection devices include desktop inkjet printers, and other such printers that may be referred to as scanning-head printing systems. Such inkjet printers may include one or several printer cartridges that are disposed in a movable arrangement relative to a movable substrate.

The apparatus and method disclosed herein may include parallel sets of components to enable color gamut expansion. Color gamut may be described as a range of colors. For example, for the apparatus and method disclosed herein, a range of colors may be expanded from cyan (C), yellow (Y), magenta (M), and black (K) to orange (O), green (G), violet (V), etc., as well as any additional colors related to brands of goods.

The apparatus and method disclosed herein may combine different types of planes, such as contone planes, halftone planes, etc., to generate a combined fixer plane that accounts for data from all printed colors. A contone plane may be described as a continuous color plane of a specific color that forms an image when combined with other contone planes. A halftone plane may be described as a plane that simulates continuous tone imagery through the use of dots, varying either in size or in spacing, thus generating a gradient type of effect. A fixer plane may be described as a plane that is printed where any color data is located to "fix" the printing material in place, making the image edges sharper and adding brilliancy to colors.

The fixer plane as disclosed herein may also include data for other types of planes, such as pre-coat, post-coat, etc. Pre-coat may be described as a type of fluid that is applied before the application of printing material. Post-coat may be described as a type of fluid that is applied after the application of printing material.

The printing material, as used herein, may include any type of ink, including latex inks. With respect to latex inks, such inks are designed to film form with heat and curing to provide a high durability print on non-porous synthetic substrates such as vinyl. In addition, printing material, as used herein comprises consumable fluids as well as other consumable materials. Printing material may comprise ink, toner, fluids, powders, colorants, varnishes, finishes, gloss enhancers, binders, and/or other such materials that may be utilized in a printing process.

For the apparatus and method disclosed herein, by adding more parallel sets of components to enable color gamut expansion, different presses with increased media widths may also be accommodated. In this regard, the apparatus and method disclosed herein may provide for the expansion of gamut and other types of printing material data generation needs, as the additional colors and fluid capabilities may be needed for certain types of print jobs. Thus, instead of being limited to five inputs (e.g., CMYK+i), the apparatus and method disclosed herein may provide for the creation of greater than one (e.g., one, two, etc.), and as disclosed herein, greater than five (e.g., six, seven, etc.) colors on web presses. By adding more parallel sets of components for those same colors, additional print width may be accommodated.

The apparatus and method disclosed herein includes an architecture that may be expanded beyond four input colors.

In this regard, instead of processing colors on a slice-pair on one slot, where each slot supports up to five colors (four input color planes and one internally generated fixer plane), in order to include expanded gamut which supports additional printing materials on a press, the apparatus and method disclosed herein includes an architecture that may be expanded beyond four input colors.

For the apparatus and method disclosed herein, by replicating additional hardware sets, additional colors may be added. In order to support replication of additional hardware sets, the data from two physical slots in the system is combined. A slot may be described as a set of backend and frontend PCAs as disclosed herein, cables, and components that form a complete hardware set. In this regard, with respect to the generation of data planes, such as a fixer plane which uses knowledge of the processed colors planes that were generated on separate slots, since the halftone plane generating PCAs as disclosed herein do not have a direct communication path, the data from two slots is combined. In this regard, by partitioning the hardware such that two (or more) slots may collaborate using multiple halftone plane generating PCAs, that access the same backend memory space on print data processing PCAs, the data from two slots is combined. Thus, the hardware arrangement of the apparatus disclosed herein may divide data over two (or more) slots and parallel sets of electronics (i.e., the halftone plane generating PCAs and the print data processing PCAs as disclosed herein), and coordinate dual direct memory access (DMA) processes.

In addition to creation of the data flow paths, for the apparatus and method disclosed herein, the memory access as disclosed herein may also be coordinated by sub-dividing a dual-swing buffer with simultaneous DMAs over Peripheral Component Interconnect Express (PCIe) to maintain data integrity in the presence of halftone plane generating PCAs. In doing so, the apparatus and method disclosed herein may include expandable degrees of freedom.

For the apparatus and method disclosed herein, by using a pair-wise (or more) arrangement within a switched architecture hardware (with each slot in the pair consisting of a halftone plane generating PCA and a print data processing PCA), the apparatus and method disclosed herein may support up to eight printing materials (or more) natively in an architecture that extends gamut. Further, the architecture for the apparatus and method disclosed herein may also be replicated to serve ever widening presses (in terms of print media width) in much the same manner as the original architecture.

When the printing materials are standard color inks, the additional slots may support further colors. When one of the printing materials uses knowledge of all processed printing materials, such as for a pre-coat, bonding agent, or post-coat, the apparatus and method disclosed herein provides the capability of addressing such needs with expanded gamut.

Some examples of the apparatus and method disclosed herein may be implemented in printing systems in which a printing material may be distributed on a build layer of build material such that these examples may perform a layer-wise additive manufacturing process. Examples of such layer-wise additive manufacturing printing systems may be referred to as three-dimensional printers. In such examples, the apparatus and method disclosed herein may selectively distribute printing materials on a layer of powder-based build material to facilitate fusion of portions of such build material. As will be appreciated, each layer may correspond to a cross-section of a three-dimensional object to be formed. Sequentially layering and fusing layers of build material on top of previous layers may facilitate generation of the three-dimensional object. In examples described herein, a build material may include a powder-based build material, where the powder-based build material may comprise wet and/or dry powder-based materials, particulate materials, and/or granular materials. For three-dimensional printers, the ejected fluids may be referred to as agents that increase energy absorption or decrease energy absorption of the media upon which the fluid is distributed. For two-dimensional printers, bonding agent, glosses, etc., may be applied as disclosed herein.

Figure 1:
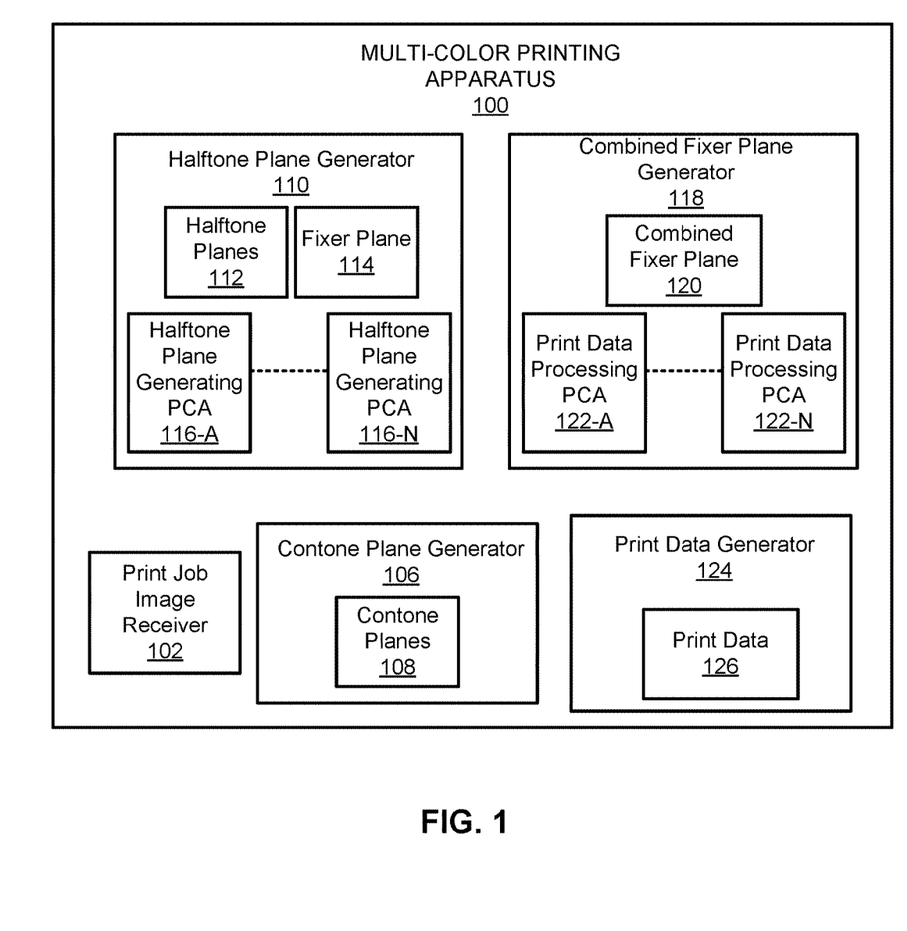
FIG. 1 illustrates an architecture of a multi-color printing apparatus, according to an example of the present disclosure.
Figure 2:
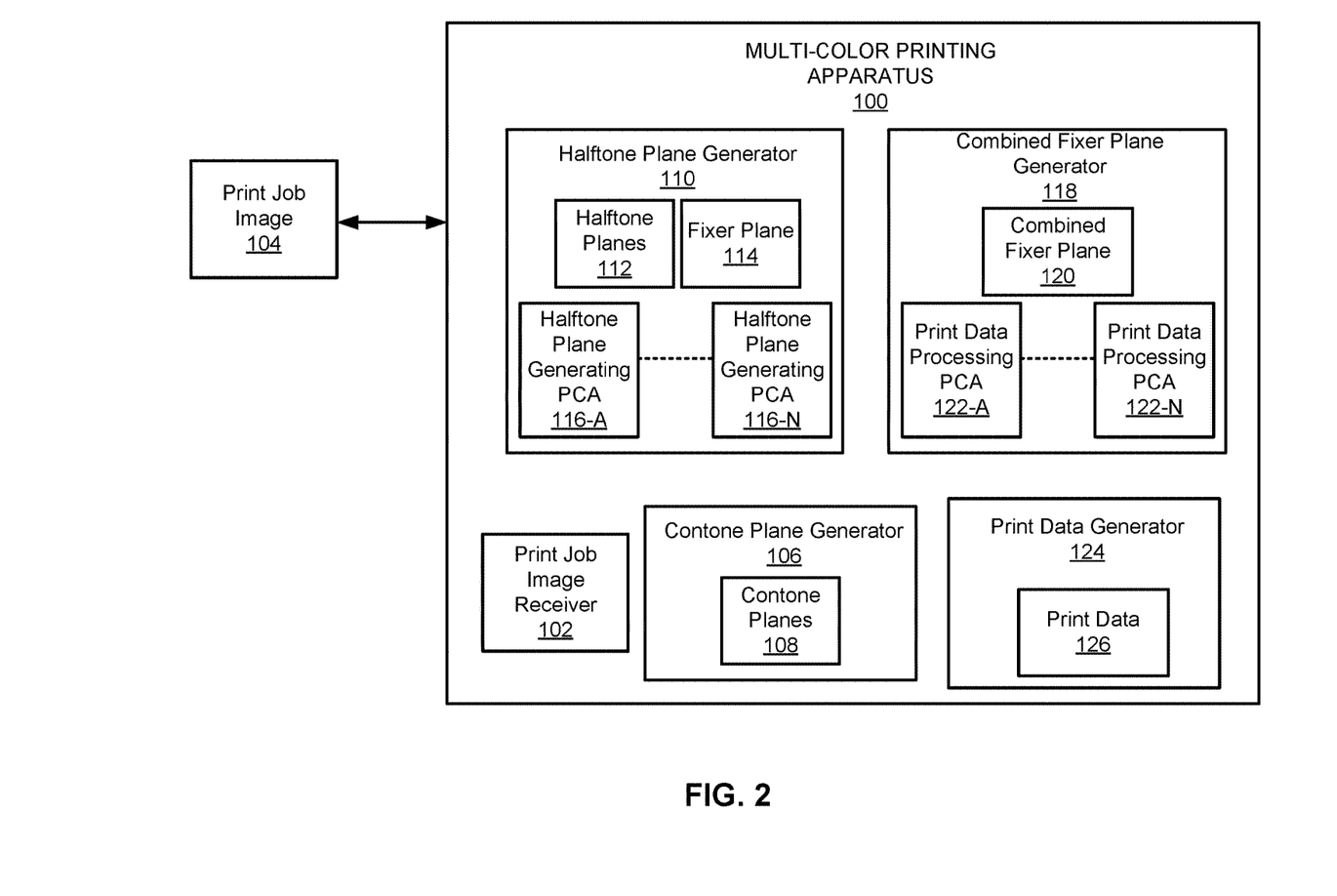
FIG. 2 illustrates an environment including the multi-color printing apparatus of FIG. 1, according to an example of the present disclosure.

FIG. 1 illustrates an architecture of a multi-color printing apparatus 100, according to an example of the present disclosure. FIG. 2 illustrates an environment including the multi-color printing apparatus 100, according to an example of the present disclosure.

Referring to FIGS. 1 and 2, the apparatus 100 may include a print job image receiver 102 to access a print job image 104. The print job image 104 may include various colors that define a colored image that is to be printed.

A contone plane generator 106 may generate, based on an analysis of the print job image 104, a plurality of contone planes 108 that represent the print job image 104. According to an example, the plurality of contone planes 108 that represent the print job image 104 include at least five contone planes, and each of the plurality of contone planes 108 represents a different color. For example, the contone planes 108 may represent a different color selected from black (K), cyan (C), magenta (M), yellow (Y), orange (O), green (G), violet (V), etc.

A halftone plane generator 110 may generate, based on an analysis of two or more sets of the contone planes determined from the plurality of contone planes 108, two or more corresponding sets of halftone planes 112 and a fixer plane 114 for each set of the halftone planes.

The halftone process may be described as a process by which the smooth color contone planes (color planes separated from the print job image 104) are transformed into 'dots' that the apparatus 100 may then replicate. Since fixer is a fluid that may be printed wherever the 'dots' will be printed, the generation of the fixer plane may be based on a combination of all of the known contone dots. For example, the fixer plane may be generated based on a hardware-based "OR" of all of the known contone planes.

The halftone plane generator 110 may include a plurality of halftone plane generating printed circuit assembly (PCAs) (e.g., halftone plane generating PCA 116-A, . . . , halftone plane generating PCA 116-N). For example, if the apparatus 100 is to be used with five to eight printing materials, then the apparatus 100 may include two fluid ejection devices that each provide for ejection of four printing materials and a fixer, and two corresponding halftone plane generating PCAs 116-A, and 116-B. Similarly, if the apparatus 100 is to be used with nine to twelve printing materials, then the apparatus 100 may include three fluid ejection devices that each provide for ejection of four printing materials and a fixer, and three corresponding halftone plane generating PCAs 116-A, 116-B, and 116-C. In this manner, the number of PCAs may be based on the number of printing materials that are to be used, and the fluid ejection capability of the fluid ejection devices.

According to an example, the two or more corresponding sets of halftone planes may include a first set of halftone planes corresponding to four contone planes of the plurality of contone planes 108, and a further set of halftone planes corresponding to a further contone plane (or a plurality of further contone planes) of the plurality of contone planes 108. Further, each of the halftone planes of the two or more corresponding sets of halftone planes represents a contone plane of a different color. For example, each of the halftone planes of the two or more corresponding sets of halftone planes represents a contone plane of a different color selected from black (K), cyan (C), magenta (M), yellow (Y), orange (O), green (G), violet (V), etc.

A combined fixer plane generator 118 may generate, based on an analysis of the fixer plane for each set of the halftone planes, a combined fixer plane 120.

According to an example, with respect to generation of the combined fixer plane 120, for a first set of halftone planes of the two or more corresponding sets of halftone planes and a corresponding fixer plane for the first set of halftone planes, the combined fixer plane generator 118 may analyze, by a first print data processing PCA 122-A, the corresponding fixer plane for the first set of halftone planes, and forward the corresponding fixer plane for the first set of halftone planes to a further print data processing PCA 122-N (e.g., where print data processing PCA 122-N is print data processing PCA 122-B for two print data processing PCAs). For a further set of halftone planes of the two or more corresponding sets of halftone planes and a corresponding fixer plane for the further set of halftone planes, the combined fixer plane generator 118 may analyze, by the further print data processing PCA 122-N, the corresponding fixer plane for the first set of halftone planes, and the corresponding fixer plane for the further set of halftone planes to generate the combined fixer plane 120.

A print data generator 124 may generate, based on an analysis of the two or more corresponding sets of halftone planes and the combined fixer plane 120, print data 126 to print the print job image 104. The print data 126 may be implemented by the apparatus 100 or another print system to cause ejection of printing materials, for example, from fluid ejection devices. The print data generator 124 may analyze the first set of halftone planes, the further set of halftone planes, and the combined fixer plane 120 to generate the print data 126 to print the print job image 104.

Figure 3:
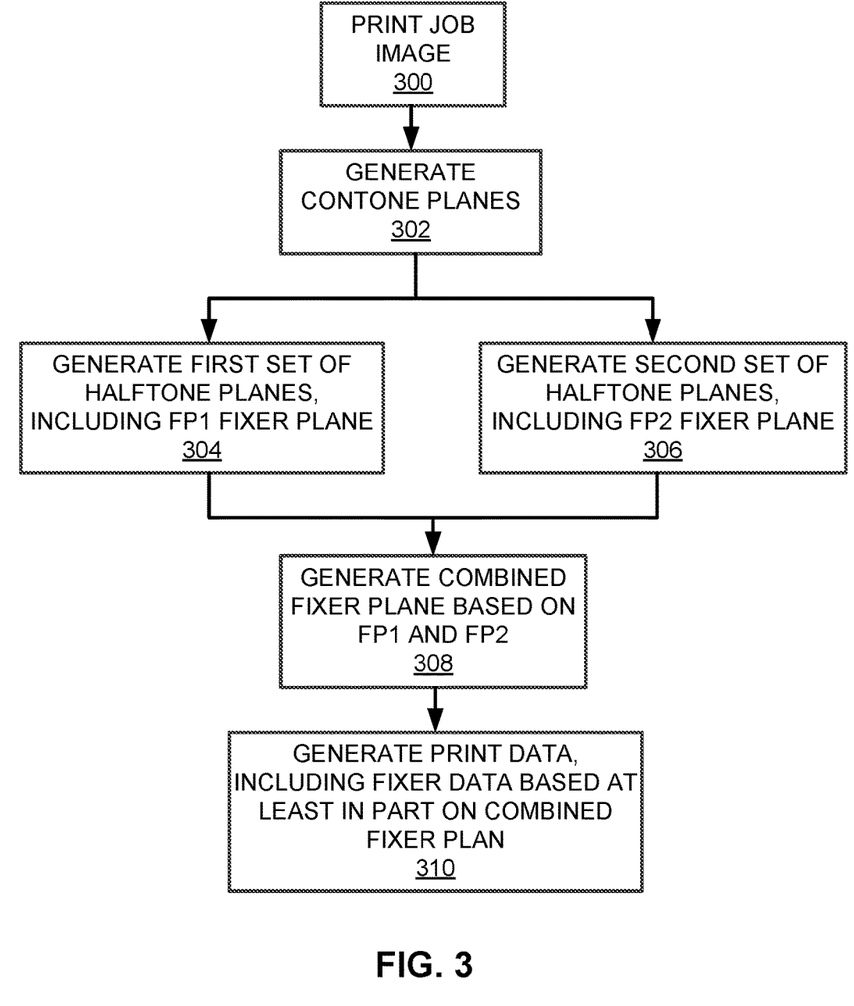
FIG. 3 illustrates a data flow for the multi-color printing apparatus of FIG. 1, according to an example of the present disclosure.
Figure 4:
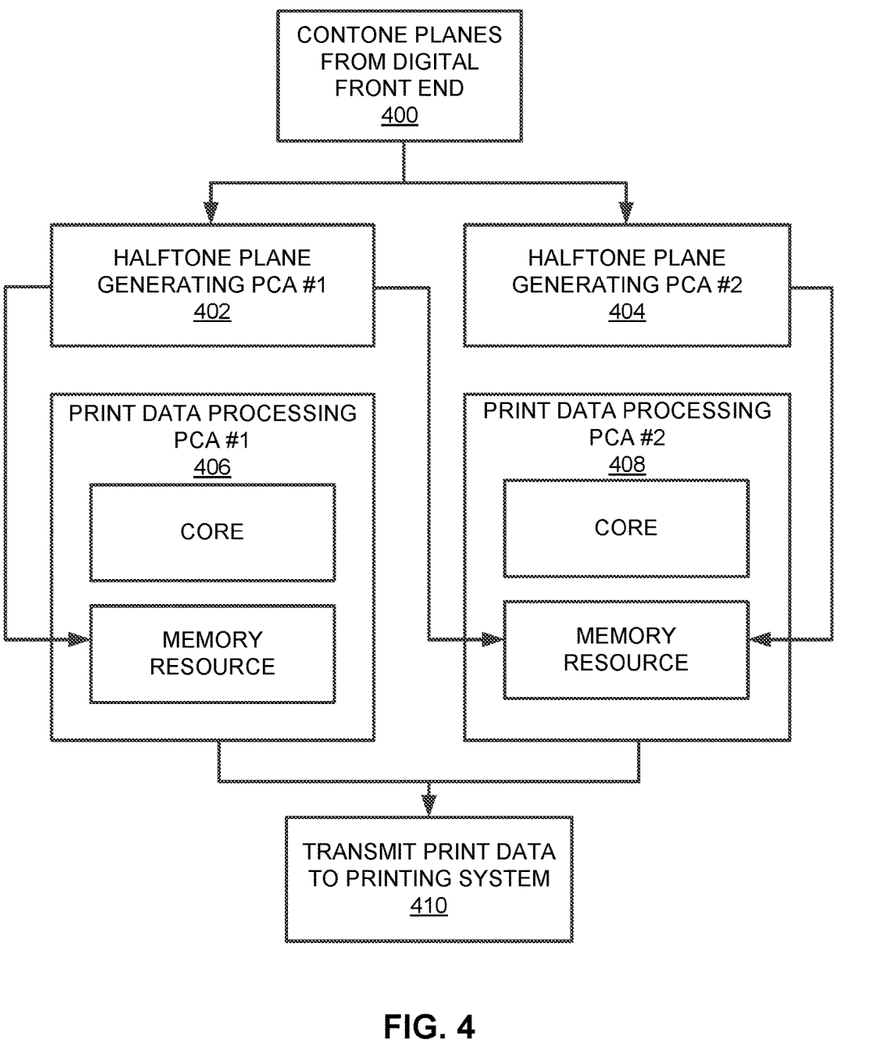
FIG. 4 illustrates a hardware flow for the multi-color printing apparatus of FIG. 1, according to an example of the present disclosure.

For an example that includes two halftone plane generating PCAs 116-A and 116-B, and two corresponding print data processing PCAs 122-A and 122-B, an example of a data flow is illustrated in FIG. 3, and an example of a hardware flow is illustrated in FIG. 4.

Referring to FIG. 3, a simplified architecture is shown of one "slice pair" in the apparatus 100. That is, the architecture of FIG. 3 shows the data flow for a narrow width of print in the cross web direction. Thus, the example of FIG. 3 illustrates the architecture for a subset of the possible media width of the apparatus 100. By replicating the flow of FIG. 3 in parallel, wider images may be produced for wider web-width printing systems, thereby making the architecture of FIG. 3 extensible and scalable for different products.

At block 300, the print job image receiver 102 may receive the print job image 104.

At block 302, the contone plane generator 106 may generate the contone planes 108. At block 302, the print job image 104 may be separated into contone planes (also referred to as color planes) by a digital front end (DFE) of the apparatus 100.

At block 304, the halftone plane generator 110 may generate a first set of halftone planes 112, including an FP1 fixer plane.

At block 306, the halftone plane generator 110 may generate a second set of halftone planes 112, including an FP2 fixer plane. Thus, the halftone plane generator 110 may generate halftone planes for a subset of colors on one halftone plane generating PCA (e.g., the halftone plane generating PCA 116-A), and may further generate a second set of halftone planes for a different subset of colors on a second halftone plane generating PCA (e.g., the halftone plane generating PCA 116-B).

At block 308, the combined fixer plane generator 118 may generate the combined fixer plane 120 based on FP1 and FP2.

At block 310, the print data generator 124 may generate the print data 126, including fixer data based at least in part on the combined fixer plane 120. The print data 126 may be used to actuate the associated fluid ejection devices of the apparatus 100 to eject the printing material.

Referring to FIG. 4 which illustrates the hardware flow for the apparatus 100, at block 400, the contone planes 108 may be received from a digital front end of the apparatus 100.

At block 402, a halftone plane generating PCA #1 (e.g., the PCA 116-A) may receive a first set the contone planes 108. Further, at block 404, a halftone plane generating PCA #2 (e.g., the PCA 116-B) may receive a further set the contone planes 108. The halftone plane generating PCA #1 and the halftone plane generating PCA #2 may respectively generate corresponding sets of halftone planes and a fixer plane for each set of the halftone planes. For the example of FIG. 4, the halftone plane generating PCA #1 may generate a first set of halftone color planes (HCP1) and a first fixer plane (FP1) based on the first set of contone planes. Similarly, the halftone plane generating PCA #2 may generate a second set of halftone color planes (HCP2) and a second fixer plane (FP2) based on the second (e.g., further) set of contone planes. The halftone plane generating PCA #1 and the halftone plane generating PCA #2 may be designated as front-end PCAs to transform the contone planes into halftoned data.

With respect to blocks 402 and 404, for the example of FIG. 4, if the contone planes 108 for a print job are (KCMYOGV), the first set of contone planes may be KCMY (black, cyan, magenta, and yellow) and the second set of contone planes may be OGV (orange, green, violet). In this example, HCP1 includes a halftone color plane for KCMY, and HCP2 includes a halftone color plane for OGV. Other colors may be used (such as "brand" colors), where the processing as disclosed herein may be applied to any set of different colors.

With respect to block 406, the halftone plane generating PCA #1 (e.g., the PCA 116-A) may forward the associated halftone planes and the associated fixer plane generated at block 402 to a memory resource of a print data processing PCA #1 (e.g., the PCA 122-A). Further, the halftone plane generating PCA #1 (e.g., the PCA 116-A) may forward the associated halftone planes and the associated fixer plane generated at block 402 to a memory resource of a print data processing PCA #2 (e.g., the PCA 122-B).

With respect to block 408, the halftone plane generating PCA #2 (e.g., the PCA 116-B) may forward the associated halftone planes and the associated fixer plane generated at block 404 to the memory resource of the print data processing PCA #2 (e.g., the PCA 122-B).

The print data processing PCA #1 (e.g., the PCA 122-A) and the print data processing PCA #2 (e.g., the PCA 122-B) may be used to generate the combined fixer plane 120. For the example of FIG. 4, based on receiving FP1 from the print data processing PCA #1, the print data processing PCA #2 may use FP1 and FP2 to generate the combined fixer plane 120. According to an example, FP1 and FP2 may be combined through an OR process. That is, the combined fixer plane 120 will have data where FP1 or FP2 had data. This combined fixer plane 120 may be further processed and enhanced in the print data processing.

The print data processing PCA #1 and the print data processing PCA #2 may be designated as backend PCAs. The processing cores of the print data processing PCAs may include direct memory access to the memory resource of the print data processing PCA. The data from the halftone plane generating PCA may be stored in the memory resource of the corresponding print data processing PCA, and the processing core may include machine readable instructions that will further process the halftoned data, and rearrange and process the data for generation of the print data 126. Examples of how the data is processed to generate the print data 126 may include, but are not limited to, dividing the data between physical printbars and printheads, changing the effective print resolution of the data, adding data for print and nozzle health enhancement, parsing the data into smaller packets, and adding control bits for communication and routing of the data.

As shown in FIG. 4, at least one of the halftone plane generating PCAs (e.g., the halftone plane generating PCA #1) may include direct memory access not only to its own print data processing PCA (e.g., the print data processing PCA #1), but to the memory resource on another print data processing PCA (e.g., the print data processing PCA #2). This access may be used for processing the fixer planes. In this regard, the fixer plane may be printed where any color data is located to "fix" the printing material in place, thus providing for sharper image edges and amplifying colors. Thus, the combined fixer plane 120 is generated from the knowledge of all planes based on the multi-access capability of the halftone plane generating PCAs and the print data processing PCAs.

With respect to block 410, the print data 126 generated by the print data generator 124 may be transmitted to a printing system (e.g., the apparatus 100, or another printing system). For the example of FIG. 4, the print data 126 may be generated for the print job based on HCP1, HCP2, and the combined fixer plane 120. In this regard, the halftoned information (e.g., HCP1 and HCP2) may be further processed based on user inputs, modes of the apparatus 100, print resolution selection, etc., and is then arranged into a format for consumption by a specific model of apparatus 100.

The distributed processing architecture disclosed herein with respect to FIG. 4 thus facilitates the ability to print more printing materials, including the ability to print fluids such as fixer, by enabling direct memory access in such a way that data from separate processing units may later be combined in a processing core. The apparatus 100 may also be configured to be used for different products as the architecture of the apparatus 100 is extensible. For example, if the architecture of the apparatus 100 is to be used in a wider product, additional processing units (e.g., the halftone plane generating PCAs, and the print data processing PCAs) may be added in parallel to accommodate the additional data for printing on the additional width of media.

In some examples, the elements of the apparatus 100 may be machine readable instructions stored on a non-transitory computer readable medium. In this regard, the apparatus 100 may include or be a non-transitory computer readable medium. In some examples, the elements of the apparatus 100 may be hardware or a combination of machine readable instructions and hardware.

Figure 5:
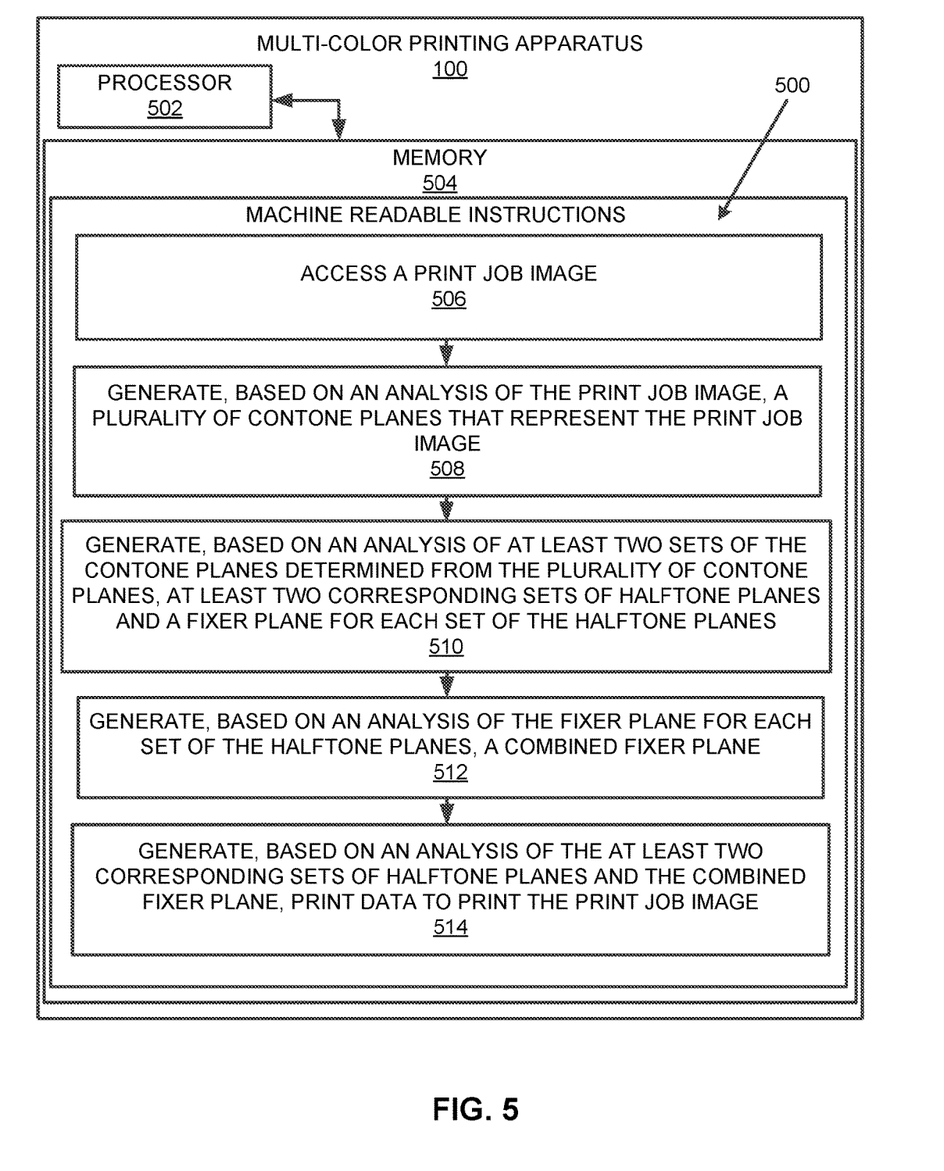
FIG. 5 illustrates a flowchart of a method for multi-color printing, according to an example of the present disclosure.
Figure 6:
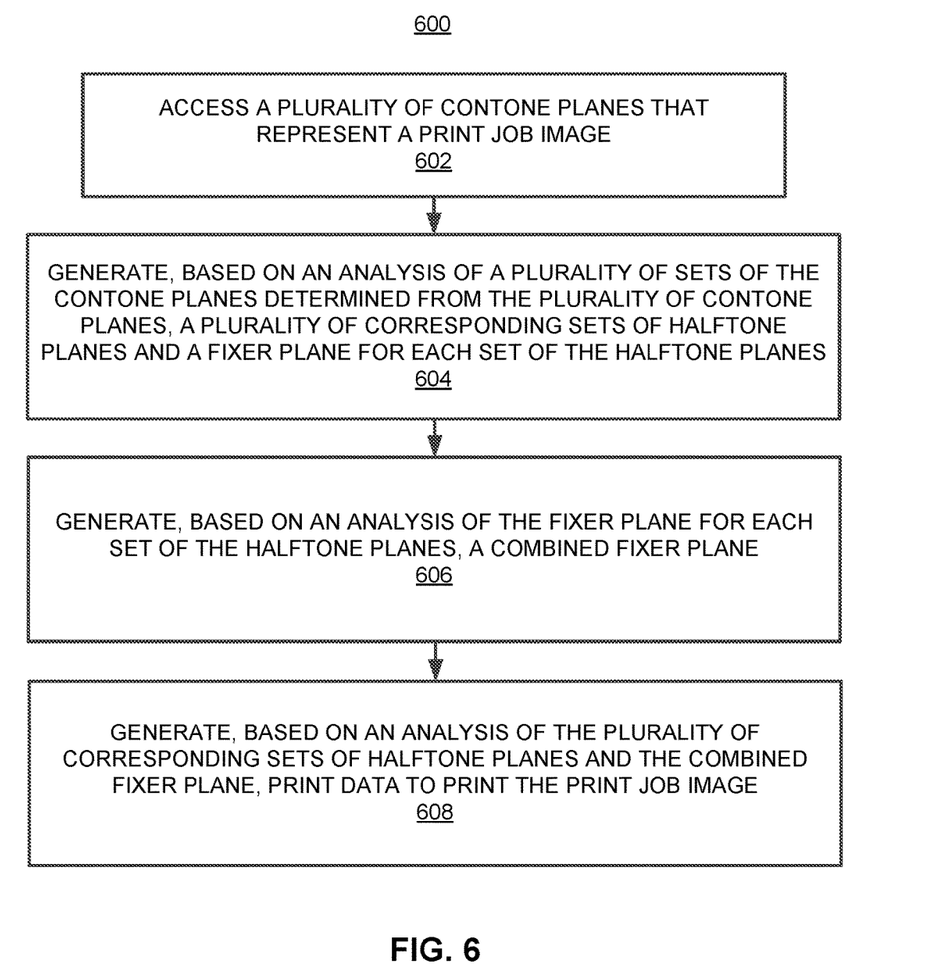
FIG. 6 illustrates a flowchart of another method for multi-color printing, according to an example of the present disclosure.
Figure 7:
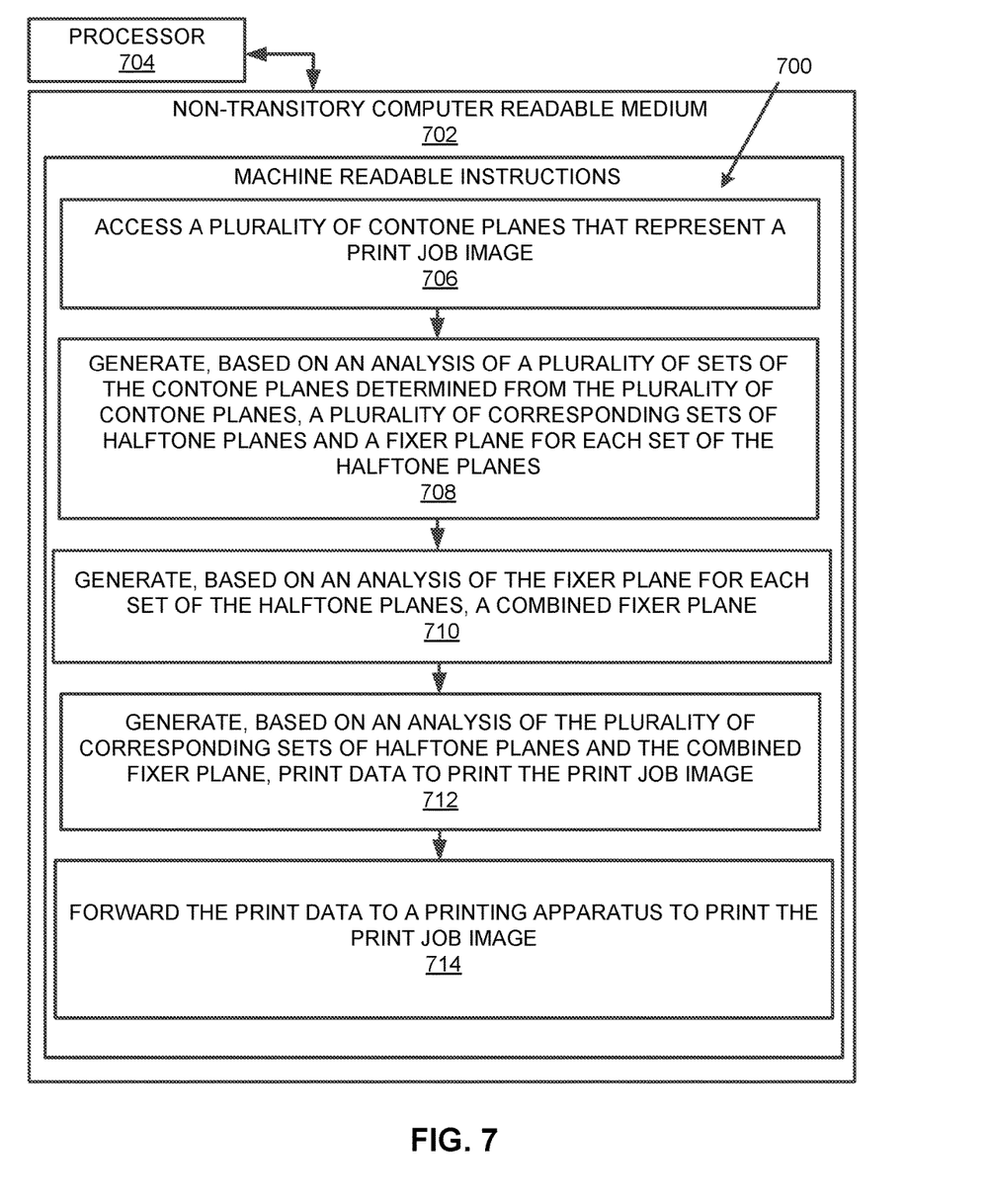
FIG. 7 illustrates a flowchart of a further method for multi-color printing, according to an example of the present disclosure.

FIGS. 5-7 respectively illustrate flowcharts of methods 500, 600, and 700 for multi-color printing, according to examples. The methods 500, 600, and 700 may be implemented on the apparatus 100 described above with reference to FIGS. 1-4 by way of example and not limitation. The methods 500, 600, and 700 may be practiced in other apparatus. In addition to showing the method 500, FIG. 5 shows hardware of the apparatus 100 that may execute the method 500. The hardware may include a processor 502, and a memory 504 storing machine readable instructions that when executed by the processor cause the processor to perform the steps of the method 500. The memory 504 may represent a non-transitory computer readable medium. FIG. 6 may represent a method for multi-color printing, and the steps of the method. FIG. 7 may represent a non-transitory computer readable medium 702 having stored thereon machine readable instructions to provide multi-color printing. The machine readable instructions, when executed, cause a processor 704 to perform steps of the method 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the method 500 shown in FIG. 5, at block 506, the method 500 may include accessing (e.g., by the print job image receiver 102) a print job image 104.

At block 508, the method 500 may include generating (e.g., by the contone plane generator 106), based on an analysis of the print job image 104, a plurality of contone planes 108 that represent the print job image 104.

At block 510, the method 500 may include generating (e.g., by the halftone plane generator 110), based on an analysis of two or more sets of the contone planes determined from the plurality of contone planes 108, two or more corresponding sets of halftone planes 112 and a fixer plane for each set of the halftone planes.

At block 512, the method 500 may include generating (e.g., by the combined fixer plane generator 118), based on an analysis of the fixer plane for each set of the halftone planes, the combined fixer plane 120.

At block 514, the method 500 may include generating (e.g., by the print data generator 124), based on an analysis of the two or more corresponding sets of halftone planes and the combined fixer plane 120, print data 126 to print the print job image 104. The print data 126 may be implemented by a printing device to cause ejection of printing materials.

Referring to FIGS. 1-5 and 6, and particularly FIG. 6, for the method 600, at block 602, the method may include accessing a plurality of contone planes 108 that represent a print job image 104.

At block 604, the method 600 may include generating (e.g., by the halftone plane generator 110), based on an analysis of a plurality of sets of the contone planes determined from the plurality of contone planes 108, a plurality of corresponding sets of halftone planes 112 and a fixer plane for each set of the halftone planes.

At block 606, the method 600 may include generating (e.g., by the combined fixer plane generator 118), based on an analysis of the fixer plane for each set of the halftone planes, a combined fixer plane 120.

At block 608, the method 600 may include generating (e.g., by the print data generator 124), based on an analysis of the plurality of corresponding sets of halftone planes and the combined fixer plane 120, print data 126 to print the print job image 104.

Referring to FIGS. 1-5 and 7, and particularly FIG. 7, for the method 700, at block 706, the method may include accessing a plurality of contone planes 108 that represent a print job image 104.

At block 708, the method 700 may include generating (e.g., by the halftone plane generator 110), based on an analysis of a plurality of sets of the contone planes determined from the plurality of contone planes 108, a plurality of corresponding sets of halftone planes 112 and a fixer plane for each set of the halftone planes.

At block 710, the method 700 may include generating (e.g., by the combined fixer plane generator 118), based on an analysis of the fixer plane for each set of the halftone planes, a combined fixer plane 120.

At block 712, the method 700 may include generating (e.g., by the print data generator 124), based on an analysis of the plurality of corresponding sets of halftone planes and the combined fixer plane 120, print data 126 to print the print job image 104.

At block 714, the method 700 may include forwarding the print data 126 to the printing apparatus 100 to print the print job image 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multi-color printing apparatus comprising:
a processor; and
a memory storing machine readable instructions that when executed by the processor cause the processor to:
access a print job image;
generate, based on an analysis of the print job image, a plurality of contone planes that represent the print job image;
generate, based on an analysis of at least two sets of the contone planes determined from the plurality of contone planes, at least two corresponding sets of halftone planes and a fixer plane for each set of the halftone planes;
generate, based on an analysis of the fixer plane for each set of the halftone planes, a combined fixer plane; and
generate, based on an analysis of the at least two corresponding sets of halftone planes and the combined fixer plane, print data to print the print job image, wherein the print data is to cause ejection of printing materials.

2. The multi-color printing apparatus according to claim 1, wherein the machine readable instructions to generate, based on the analysis of the fixer plane for each set of the halftone planes, the combined fixer plane further comprise machine readable instructions to cause the processor to:
for a first set of halftone planes of the at least two corresponding sets of halftone planes and a corresponding fixer plane for the first set of halftone planes
analyze, by a first print data processing printed circuit assembly (PCA), the corresponding fixer plane for the first set of halftone planes, and
forward the corresponding fixer plane for the first set of halftone planes to a further print data processing PCA; and
for a further set of halftone planes of the at least two corresponding sets of halftone planes and a corresponding fixer plane for the further set of halftone planes
analyze, by the further print data processing PCA, the corresponding fixer plane for the first set of halftone planes, and the corresponding fixer plane for the further set of halftone planes to generate the combined fixer plane.

3. The multi-color printing apparatus according to claim 2, wherein the machine readable instructions to generate, based on the analysis of the at least two corresponding sets of halftone planes and the combined fixer plane, print data to print the print job image further comprise machine readable instructions to cause the processor to:
analyze the first set of halftone planes, the further set of halftone planes, and the combined fixer plane to generate the print data to print the print job image.

4. The multi-color printing apparatus according to claim 1, wherein
the plurality of contone planes that represent the print job image include at least five contone planes, and
each of the plurality of contone planes represents a different color.

5. The multi-color printing apparatus according to claim 1, wherein
the at least two corresponding sets of halftone planes include
a first set of halftone planes corresponding to four contone planes of the plurality of contone planes, and
a further set of halftone planes corresponding to at least one further contone plane of the plurality of contone planes, and
each of the halftone planes of the at least two corresponding sets of halftone planes represents a contone plane of a different color.

6. A method for multi-color printing, the method comprising:
accessing a plurality of contone planes that represent a print job image;
generating, based on an analysis of a plurality of sets of the contone planes determined from the plurality of contone planes, a plurality of corresponding sets of halftone planes and a fixer plane for each set of the halftone planes;
generating, based on an analysis of the fixer plane for each set of the halftone planes, a combined fixer plane; and
generating, based on an analysis of the plurality of corresponding sets of halftone planes and the combined fixer plane, print data to print the print job image, wherein the print data is to cause ejection of printing materials.

7. The method according to claim 6, wherein generating, based on the analysis of the fixer plane for each set of the halftone planes, the combined fixer plane further comprises:
for a first set of halftone planes of the plurality of corresponding sets of halftone planes and a corresponding fixer plane for the first set of halftone planes, and for a further set of halftone planes of the plurality of corresponding sets of halftone planes and a corresponding fixer plane for the further set of halftone planes analyzing the corresponding fixer plane for the first set of halftone planes, and the corresponding fixer plane for the further set of halftone planes to generate the combined fixer plane.

8. The method according to claim 7, wherein generating, based on the analysis of the plurality of corresponding sets of halftone planes and the combined fixer plane, print data to print the print job image further comprises:

analyzing the first set of halftone planes, the further set of halftone planes, and the combined fixer plane to generate the print data to print the print job image.

9. The method according to claim 6, wherein generating, based on the analysis of the plurality of sets of the contone planes determined from the plurality of contone planes, the plurality of corresponding sets of halftone planes and the fixer plane for each set of the halftone planes further comprises:

identifying at least five contone planes for the plurality of contone planes that represent the print job image, wherein each of the plurality of contone planes represents a different color;

dividing the at least five contone planes into the plurality of sets of the contone planes; and generating, based on the analysis of the plurality of sets of the contone planes determined from the plurality of contone planes, the plurality of corresponding sets of halftone planes and the fixer plane for each set of the halftone planes.

10. The method according to claim 6, wherein generating, based on the analysis of the plurality of corresponding sets of halftone planes and the combined fixer plane, print data to print the print job image further comprises:

identifying a first set of halftone planes corresponding to four contone planes of the plurality of contone planes;

identifying a further set of halftone planes corresponding to at least one further contone plane of the plurality of contone planes, wherein each of the halftone planes of the plurality of corresponding sets of halftone planes represents a contone plane of a different color; and generating, based on the analysis of the first set of halftone planes, the further set of halftone planes, and the combined fixer plane, print data to print the print job image.

11. A non-transitory computer readable medium having stored thereon machine readable instructions to provide multi-color printing, the machine readable instructions, when executed, cause a processor to:

access a plurality of contone planes that represent a print job image;

generate, based on an analysis of a plurality of sets of the contone planes determined from the plurality of contone planes, a plurality of corresponding sets of halftone planes and a fixer plane for each set of the halftone planes;

generate, based on an analysis of the fixer plane for each set of the halftone planes, a combined fixer plane;

generate, based on an analysis of the plurality of corresponding sets of halftone planes and the combined fixer plane, print data to print the print job image; and forward the print data to a printing apparatus to print the print job image, wherein the print data is to cause ejection of printing materials.

12. The non-transitory computer readable medium of claim 11, wherein the machine readable instructions to generate, based on the analysis of the fixer plane for each set of the halftone planes, the combined fixer plane, when executed, further cause the processor to:

for a first set of halftone planes of the plurality of corresponding sets of halftone planes and a corresponding fixer plane for the first set of halftone planes, and for a further set of halftone planes of the plurality of corresponding sets of halftone planes and a corresponding fixer plane for the further set of halftone planes analyze the corresponding fixer plane for the first set of halftone planes, and the corresponding fixer plane for the further set of halftone planes to generate the combined fixer plane.

13. The non-transitory computer readable medium of claim 12, wherein the machine readable instructions to generate, based on the analysis of the plurality of corresponding sets of halftone planes and the combined fixer plane, print data to print the print job image, when executed, further cause the processor to:

analyze the first set of halftone planes, the further set of halftone planes, and the combined fixer plane to generate the print data to print the print job image.

14. The non-transitory computer readable medium of claim 11, wherein the machine readable instructions to generate, based on the analysis of the plurality of sets of the contone planes determined from the plurality of contone planes, the plurality of corresponding sets of halftone planes and the fixer plane for each set of the halftone planes, when executed, further cause the processor to:

identify at least five contone planes for the plurality of contone planes that represent the print job image, wherein each of the plurality of contone planes represents a different color;

divide the at least five contone planes into the plurality of sets of the contone planes; and generate, based on the analysis of the plurality of sets of the contone planes determined from the plurality of contone planes, the plurality of corresponding sets of halftone planes and the fixer plane for each set of the halftone planes.

15. The non-transitory computer readable medium of claim 11, wherein the machine readable instructions to generate, based on the analysis of the plurality of corresponding sets of halftone planes and the combined fixer plane, print data to print the print job image, when executed, further cause the processor to:

identify a first set of halftone planes corresponding to four contone planes of the plurality of contone planes;

identify a further set of halftone planes corresponding to at least one further contone plane of the plurality of contone planes, wherein each of the halftone planes of the plurality of corresponding sets of halftone planes represents a contone plane of a different color; and generate, based on the analysis of the first set of halftone planes, the further set of halftone planes, and the combined fixer plane, print data to print the print job image.

* * * * *